Figure 1:
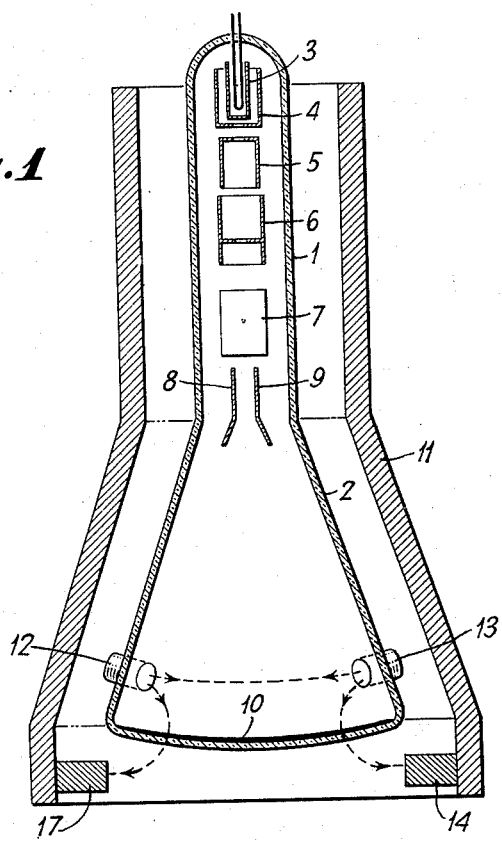

Oct. 14, 1941. J. DE GIER ET AL 2,258,643

DISTORTION CORRECTION FOR CATHODE RAY TUBES

Filed April 22, 1939

INVENTOR
JOHANNES De GIER
ARIE ANDRIES KRUITHOF
FRANS MICHEL PENNING
BY
ATTORNEY

Patented Oct. 14, 1941

2,258,643

UNITED STATES PATENT OFFICE 2,258,643

DISTORTION CORRECTION FOR CATHODE RAY TUBES

Johannes de Gier, Arie Andries Kruithof, and Frans Michel Penning, Eindhoven, Netherlands, assignors to N. V. Philips' Gloeilampenfabrieken, Eindhoven, Netherlands, a corporation of the Netherlands Application April 22, 1939, Serial No. 269,370
In Germany April 25, 1938

5 Claims. (Cl. 250—157)

This invention relates to cathode ray tubes and in particular to methods and means for correcting distortion in optical representations produced in such tubes under the control of electrical signals.

In cathode ray tubes different causes may be responsible for distortions of the light image produced by the cathode ray beam at the point of impact on a fluorescent screen. If the beam is deflected by electrostatic deflecting devices, then one of these causes is the effect of an electric field between one of the pairs of deflecting plates on the one hand and the second pair of plates on the other hand. If one plate of a pair of deflecting plates has a fixed potential relatively to the cathode and the other a fluctuating potential such distortions are particularly noted.

If, for example, a rectangle has to be filled with the beam, then the image field may have a keystone or trapezoidal area instead of a rectangular shape as a consequence of the image distorting causes.

In addition, the image may be trapezoidally distorted due to the screen of impact being inclined to the axis of the electrode system, as is sometimes the case with tubes for image-scanning in the transmitter.

It has previously been suggested to arrange in the latter case, adjacent the point of deflection, a magnet producing a correcting magnetic field directly behind the point of deflection of the beam of rays.

According to the invention, a different course is adapted in order to neutralize distortion by magnetic means. The invention is based on recognition of the fact that in contradistinction to the electrostatic method it is unfavorable to cause correcting magnetic fields to act on the beam of rays in the proximity of the deflecting means.

Accordingly, in an arrangement embodying the invention the magnet poles that bring about the correction field are not arranged adjacent the deflecting means but adjacent the point of impact and remote from the point of deflection. The correcting fields thus act at a point where the area over which the beam is deflected has a large cross-section. The correction field can consequently be rendered sufficiently ununiform within the region where correction should be brought about. If on the contrary a magnetic correction field is provided adjacent the point of deflection at which the area over which the beam is deflected has a small cross-section, then the said field acts on the entire beam, that is to say the beam is constantly deflected by the auxiliary magnetic field and the image produced at the point of impact is displaced as a whole. As regards correction the mean intensity of the magnetic field taken over the image field is not essential but the differences in intensity are important. In the case of correction adjacent the point of deflection sufficiently wide differences can only be produced by powerful magnetic fields so that in this case a substantial displacement of image has to be taken into account, that is if there is any possibility of ensuring sufficient uniformity of the magnetic field. The invention permits of creating wide differences in intensity at a low mean intensity.

Figure 2:
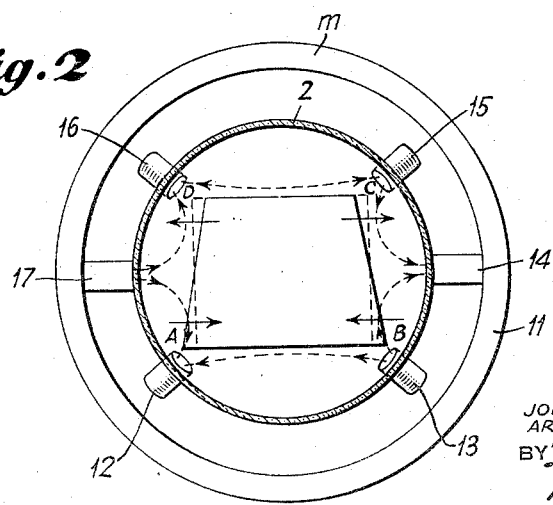

In order that the invention may be clearly understood and readily carried into effect it will now be described more fully and efficient further developments will be indicated with reference to the accompanying drawing, in which Fig. 1 is a diagrammatic view of a cathode ray beam comprising a magnetic arrangement according to the invention;

Fig. 2 is a plan of the image screen of a cathode ray tube towards the cathode.

The cathode ray tube has an exhausted glass container comprising a cylindrical part 1 and a funnel-shaped tapered part 2. The indirectly heated cathode 3 and the control electrode 4 by which it is surrounded as well as the anode 5 and the accelerating electrode 6 serve for the production of the cathode ray beam. The tube contains in addition two couples of deflecting plates 7 and 8, 9 and a fluorescent screen 10.

A metal shield 11 of iron shaped similarly to the container surrounds the tube at a small intermediate space and protects it against the action of external electric or magnetic fields.

In the use of the tube one plate of each of the two couples of deflecting plates is connected to the accelerating electrode 6 and the other plates have different potentials fluctuating with respect to the voltage of the electrode 6 supplied to them. If no provision is made of any further means, then the deflection which is imparted to the cathode ray beam is interfered with due to the asymmetrical potential distribution so that the pattern does not correspond exactly to the voltages supplied to the plates. If, for example, the deflecting voltages are such that a right-angled area is to appear on the fluorescent screen of the tube, then the result is that a trapezoidal area is recorded instead of a rectangle. In Fig. 2 this is designated by ABCD.

According to the invention, magnet poles 12, 13, 14, 15, 16 and 17 are arranged adjacent the point of impact, that is to say in the proximity of the target electrode, as for example, a fluorescent screen, said poles producing ununiform magnetic fields. These magnetic fields are so directed and distributed about the image area that they exert forces on the cathode rays which bring about a correction of the distorted parts. These forces have to be oppositely directed at the corners A and B and the magnetic field, taken over the entire image area, has to be quite ununiform. This cannot be obtained by a correction field adjacent the point of deflection at which the image cross-section is still very small. In order to obtain in situ the required heterogeneous distribution there would be need for such intense fields that a large displacement of the beam would have to be taken into account. The disturbance due thereto would be even more unfavorable than the distortion to be neutralized by the magnetic field.

The magnet poles provided in the form of construction shown are secured to the protective sheath 11 which serves as a magnet yoke. If they have to serve for neutralizing a trapezoidal distortion, then two magnet poles of different polarity may be arranged on either side of the bases AB of the trapezium symmetrically to the central line $m$. On one side of the bases are arranged the magnet poles 12 and 13 and on the other side the magnet poles 14 and 17. In many cases these four poles will be sufficient, but it is, however, preferable that the distance between the poles 12 and 13 or 14 and 17 respectively should exceed the distance between the poles 12 and 17 or 13 and 14 respectively, in order that the base AB should not be curved. The field between the poles 12 and 17 and the field between the poles 13 and 14 should preferably be substantially more intense than the field between 12 and 13 and between 14 and 17 which should exercise a minimum influence.

The correction can be further improved by arranging for the short parallel sides of the trapezium CD being enclosed between four magnet poles. In Fig. 2 they are therefore the poles 14, 15, 16 and 17. The inserted curves indicate the course of a line of force and the forces exerted by the magnetic field on the electrons are represented in the figure by arrows. It is found that due to these forces the upright sides of the trapezium undergo slight rotation about their centre so that a rectangle is formed. No magnetic forces should act centrally of the upright sides AB and CD. In order to render ineffective any forces that may still exist at these points, the magnet poles 14 and 17 may be slightly displaced towards the other poles in the direction of the axis as shown in the drawing, so that the magnetic field-intensity gets a component in the direction of the rays which cannot bring about any deflection of rays, while the component directed transversely to the direction of rays is decreased and may even become equal to zero.

An important advantage of the invention resides in that for deflecting voltages fluctuating symmetrically to the anode voltage the same tubes may be used as for asymmetrically fluctuating deflection voltages. There is only need for the tube container being provided with a suitable set of magnet poles.

Having described our invention, what we claim is:—

1. In a cathode ray tube wherein is provided means for deflecting a beam of electrons over a target electrode, the method of reducing keystone distortion which comprises producing a plurality of magnetic fields immediately adjacent the target electrode, said fields being substantially independent of and non-reacting with said deflecting means, and regulating the intensity of the produced magnetic fields to provide a non-uniform field distribution over a surface immediately adjacent and equidistant from the target electrode.

2. In a cathode ray tube wherein is provided means for deflecting a beam of electrons over a target electrode, the method of reducing keystone distortion which comprises producing a first pair of magnetic fields of predetermined intensity immediately adjacent the target electrode, producing a second pair of magnetic fields whose intensity is different from the predetermined intensity of the first pair of produced magnetic fields, said produced second pair of magnetic fields being immediately adjacent the target electrode, both of said pairs of fields being substantially independent of and non-reacting with said deflecting means, the components of all of said magnetic fields over a surface equidistant from the target electrode having a value substantially equal to zero along a line of symmetry normal to two opposite sides of the area of the target electrode over which the beam of electrons is deflected and having an intensity distribution complementary to the field intensity distribution producing the keystone distortion, whereby the area of the target electrode over which the beam of electrons is deflected is rendered rectangular.

3. A cathode ray distortion correcting system comprising a cathode ray tube having means to generate a beam therein, a target electrode, and means to deflect the beam over the area of the target electrode, means for producing a plurality of electro-magnetic fields immediately adjacent the target electrode, said fields being substantially independent of and non-reacting with said deflecting means, and means for regulating the intensity of the produced magnetic fields to provide a non-uniform field distribution over a surface immediately adjacent and equidistant from the target electrode.

4. A cathode ray distortion correcting system comprising a cathode ray tube having means to generate a beam therein, a target electrode, and means to deflect the beam over the area of the target electrode, means for producing a first pair of magnetic fields of predetermined intensity immediately adjacent the target electrode, means for producing a second pair of magnetic fields whose intensity is different from the predetermined intensity of the first pair of produced magnetic fields, said produced second pair of magnetic fields being immediately adjacent the target electrode, both of said pairs of fields being substantially independent of and non-reacting with said deflecting means, the components of all of said magnetic fields over a surface equidistant from the target electrode having a heterogeneous distribution whose field intensity is complementary to the field intensity producing the keystone distortion whereby the area of the target electrode over which the beam is deflected is rendered rectangular.

5. A cathode ray tube system comprising a cathode ray tube having means for producing a beam of electrons, a target electrode and means for deflecting the beam of electrons over the area of the target electrode, a magnetic shield surrounding the tube, a plurality of magnetic pole pieces diametrically opposed mounted upon the interior of the shield and longitudinally displaced from the target electrode, and a further plurality of magnetic poles mounted on the magnetic shield and positioned intermediate the deflecting means and target electrode and adjacent thereto, said pole pieces and poles having such longitudinal displacement from said deflecting means as to be substantially independent of and non-reacting with said deflecting means.

JOHANNES DE GIER.
ARIE ANDRIES KRUITHOF.
FRANS MICHEL PENNING.